United States Patent
Brown Elliott (10) Patent No.: US 8,891,151 B2
(45) Date of Patent: Nov. 18, 2014

(54) ELECTRO-WETTING COLOR DISPLAY

(75) Inventor: Candice Hellen Brown Elliott, Santa Rosa, CA (US)

(73) Assignee: Samsung Display Co., Ltd. (KR)

( * ) Notice: Subject to any disclaimer, the term of this patent is extended or adjusted under 35 U.S.C. 154(b) by 432 days.

(21) Appl. No.: 13/031,130

(22) Filed: Feb. 18, 2011

(65) Prior Publication Data

US 2012/0212792 A1     Aug. 23, 2012

(51) Int. Cl.
*G02F 1/03* (2006.01)
*G02B 26/00* (2006.01)
*G02B 5/20* (2006.01)

(52) U.S. Cl.
CPC .......... *G02B 5/201* (2013.01); *G02B 2207/115* (2013.01)
USPC .......................................... 359/253; 359/291

(58) Field of Classification Search
USPC ......... 359/296, 265, 228, 290–292, 295, 298, 359/245, 253; 345/88, 107; 349/89
See application file for complete search history.

(56) References Cited

U.S. PATENT DOCUMENTS

| | | | | |
|---|---|---|---|---|
| 7,561,131 | B2 * | 7/2009 | Ijzerman et al. | 345/87 |
| 8,059,328 | B1 * | 11/2011 | Kuo et al. | 359/290 |
| 8,203,512 | B2 * | 6/2012 | Marcu et al. | 345/84 |

OTHER PUBLICATIONS

Ken Werner, "A New Way of Getting Color from ePaper Displays." Display Daily, Jan. 11, 2011, Insight Media, www.insightmedia.info, Norwalk, CT.

* cited by examiner

*Primary Examiner* — Tuyen Tra
(74) *Attorney, Agent, or Firm* — Innovation Counsel LLP (57) ABSTRACT

A display panel that includes a first electro-wetting member having a first colored liquid of a first color and a second electro-wetting member having a second colored liquid of a second color is presented. The second electro-wetting member is disposed on the first electro-wetting member such that the first colored liquid overlaps the second colored liquid. The shapes of the liquid of the first color and the liquid of the second color are independently controllable. A method of manufacturing such display panel is also presented.

16 Claims, 8 Drawing Sheets

ELECTRO-WETTING COLOR DISPLAY

FIELD OF THE INVENTION

The invention relates generally to an electro-wetting display device and more specifically to an electro-wetting display device capable of color display.

BACKGROUND

Electro-wetting (EW) displays are flat-panel display devices that work in both reflective and transmissive configurations and offer advantages over other types of displays. Their optically-simple configuration allows them to function without polarizers, which limit the optical throughput of liquid crystal displays (LCDs). Due to the absence of polarizers, EW displays may be brighter or function at lower power consumption than LCDs in transmissive mode. Since EW displays can function efficiently in reflective mode, they generally offer better contrast in bright environments (e.g., with sunlight) than OLEDs. In black and white reflective mode, EW displays have similar contrast and brightness as a black and white electrophoretic display but offers a significantly faster response time.

A current challenge is to provide an EW display with color display capability. Although EW displays are potentially better than LCDs from power efficiency standpoint, the difference is usually not dramatic enough to push anyone to switch from LCDs to EW displays. EW displays may be better than electrophoretic displays from video speed standpoint but often do not provide better color brightness and contrast in reflective modes.

An EW display which can provide high color brightness and contrast, high video speed, and fully reflective sunlight readability is desired.

SUMMARY

In one aspect, the invention includes a display panel that includes a first electro-wetting panel having a first colored liquid of a first color and a second electro-wetting panel having a second colored liquid of a second color. The second electro-wetting panel is disposed on the first electro-wetting panel such that the first colored liquid overlaps the second colored liquid. The shapes of the first and second colored liquids are independently controllable.

In another aspect, the invention includes a method of manufacturing a display panel. The method entails providing a first member having a first substrate, a first pixel electrode connected to a first switching device, a first hydrophobic layer, and a first colored liquid of a first color; providing a second member having a second substrate, a second pixel electrode connected to a second switching device, a second hydrophobic layer, and a second colored liquid of a second color; combining the first and second member such that the first and second colored liquids overlap spaced apart from each other by a gap; and filling the gap with a colorless liquid.

In yet another aspect, the invention includes a display panel including a first member having a first substrate, a first pixel electrode connected to a first switching device, a first hydrophobic layer, and a first colored liquid of a first color; and a second member having a second substrate, a second pixel electrode connected to a second switching device, a second hydrophobic layer, and a second colored liquid of a second color, wherein the first member and the second member are coupled to each other such that the first and second colored liquids overlap.

BRIEF DESCRIPTION OF THE DRAWINGS

Figures are provided for illustrative purposes, and are not drawn to scale.

DETAILED DESCRIPTION

A dual-layer EW panel design to provide high color brightness and contrast, high video speed, and good outside readability is presented. The invention is suitable for various applications including but not limited to color e-book with video entertainment capability, portable instrumentation (e.g., portable defibrillators measuring heart rhythms, camcorders), remote security equipment, telecommunication test equipment, automotive or avionic GPS, fish finders, or other portable applications incorporating displays that need to work at higher speed in variable-ambient-light situations.

The display device of the present invention includes a plurality of EW layers. In one embodiment, a first layer uses red, green, and blue liquids and a second layer uses cyan, magenta, and yellow liquids. In another embodiment, a first layer uses black liquid and the second layer uses red, green, and blue liquids. Structural and operational details of these devices are provided below. Alternatively, other complementary color choices are possible as will be apparent to those skilled in the art.

As used herein, a "metamer" on a subpixelated display is a combination of at least two groups of colored subpixels such that there exist signals that, when applied to each such group, yields a desired color that is perceived by the human vision system.

Figure 1:
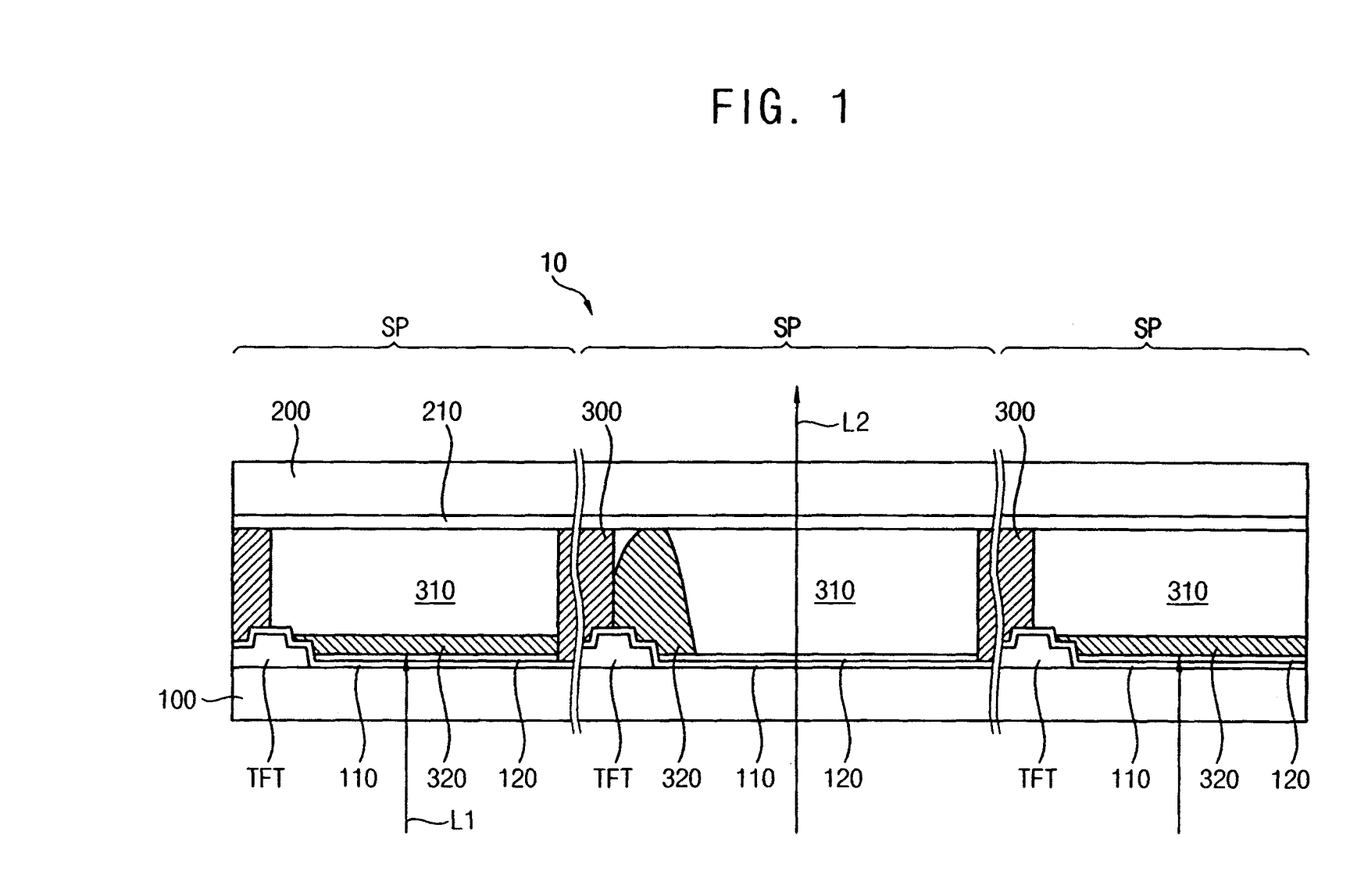
FIG. 1 is a cross-sectional diagram of an electro-wetting panel.

FIG. 1 is a cross-sectional diagram of an electro-wetting (EW) panel 10. The EW panel 10 includes a first substrate 100, a second substrate 200 with a transparent common electrode 210, and partitions 300 that are formed between subpixel areas SP. The first and second substrates 100, 200 are transparent. Each subpixel area SP contains a colorless liquid 310 and a colored liquid 320. Each subpixel area SP has a hydrophobic layer 120 and a thin film transistor (TFT) that controls the voltage applied to a pixel electrode 110.

The colorless liquid 310 and the colored liquid 320 are immiscible. For example, the colorless liquid 310 may be a polar liquid such as water, and the colored liquid 320 may be a nonpolar liquid such as oil, or vice versa. The hydrophobic layer 120 may be made of any suitable material that the colorless liquid wants to contact in the presence of an electric field created by a potential difference, and minimally contacts in the absence of an electric field. The TFT may be replaced by any other suitable switching device.

The potential difference between the pixel electrode 110 and the common electrode 210 is controlled by the voltages applied to the two electrodes 110, 210. Although the common electrode 210 receives a same voltage Vcom across a group of subpixel areas SP, the potential difference within each subpixel area SP—and therefore the shape of the colored liquid 320 in each subpixel area SP—is independently and individually controllable because each subpixel area SP has its own pixel electrode 110 and TFT.

The state, or the shape, of the colored liquid 320 of each subpixel area SP is controlled by the potential difference within each subpixel area SP, which affects how much the colorless liquid 310 wants to contact the hydrophobic layer 120. For example, when no potential difference is applied to a subpixel area SP, the colorless liquid 310 minimizes its contact area with the hydrophobic layer 120. This tendency results in the colored liquid 320 covering substantially the entire hydrophobic layer 120 to create a barrier between the colorless liquid 310 and the hydrophobic layer 120. As used herein, the state in which the colored liquid 320 covers substantially the entire hydrophobic layer 120 is referred to as the subpixel being "off."

When a potential difference is applied to a subpixel area SP, it becomes more favorable for the subpixel to increase the contact area between the colorless liquid 310 and the hydrophobic layer 120. The colored liquid 320 "gets out of the way" by contracting into a corner of the subpixel area SP. When the colorless liquid 310 has a large contact area with the hydrophobic layer 120, this state is herein referred to as the subpixel being "on". Although much of the description will refer to a subpixel as being "on" or "off" for simplicity, the potential difference may be adjusted to achieve varying degrees of coverage for the hydrophobic layer 120 for each subpixel. For example, where "off" state represents maximum coverage and "on" state represents minimum coverage of the hydrophobic layer 120, the shape of the colored liquid 320 may be adjusted to levels of intermediate coverage between the maximum and the minimum according to the potential difference.

In the embodiment of FIG. 1, the colorless liquid 310 is clear and colorless while the colored liquid 320 may be dark-colored (e.g., black). For purposes of the description here, "black" is treated as a color. Any known and suitable method of coloring the colored liquid 320 may be used, such as adding a dye. As shown in FIG. 1, the leftmost subpixel is "off." A ray of light L1 that is incident on the leftmost subpixel area SP from the bottom becomes absorbed by the colored liquid 320 and does not exit the panel 10 on the other side (top). In contrast, the middle subpixel area SP is turned "on," letting a ray of light L2 pass through the subpixel. By actively controlling all the subpixels in a panel 10, an image may be presented.

In some embodiments, the colored liquid 320 may be colored to have a color other than black in each of the subpixel areas SP, such as red, green, and blue. If the colored liquid 320 is red in a subpixel area SP, the light that exits the subpixel is red. If the colored liquid 320 in a subpixel area SP is green, the light that exits the subpixel is green. If the colored liquid 320 is blue, the light that exits the subpixel is blue. When a potential difference is applied to a subpixel, the light that exits the subpixel is colorless "white." Hence, from the top of the electro-wetting panel 10, different colored lights can be seen from different subpixel areas SP and a color image may be presented.

In a transmissive panel, the light rays L1, L2 of FIG. 1 may be provided by a light emitting source placed below the panel 10 ("below" being with respect to FIG. 1). In a reflective panel, which uses ambient light to present an image, a reflective layer (not shown) may be added below the panel 10, for example just below the first substrate 100.

Figure 2:
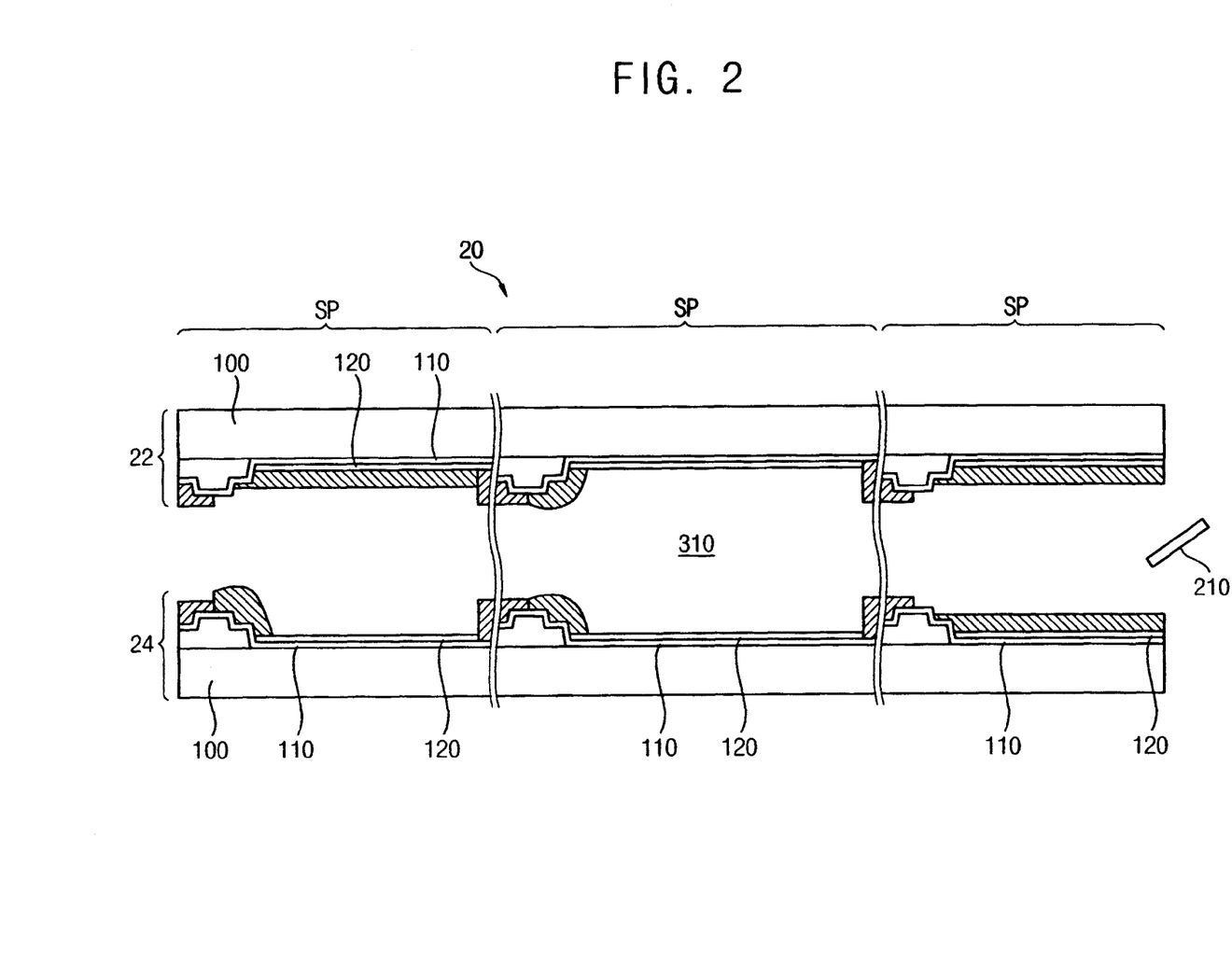
FIG. 2 is a cross-sectional diagram of a dual-layer electro-wetting panel in accordance with the invention.

FIG. 2 is a cross-sectional diagram of a dual-layer electro-wetting panel 20 in accordance with the invention. As shown, the dual-layer electro-wetting panel 20 has a first EW member 22 and a second EW member 24 disposed to overlap one another. The two members 22, 24 are aligned such that the subpixel areas SP of the first EW member 22 are aligned with the subpixel areas SP of the second EW member. Each EW member includes a substrate 100, pixel electrode 110, a TFT, and hydrophobic layers 120 arranged similarly to what is shown in FIG. 1. The substrate 100 is transparent. Between the two panels 22, 24 is the colorless liquid 310. The common electrode 210 is provided to apply a voltage to the colorless liquid 310. The subpixels in the first EW member 22 are turned "on" and "off" according to the potential difference between the common electrode 210 and the pixel electrodes 110 of the first EW member 22. Similarly, the subpixels in the second EW member 24 are turned "on" and "off" according to the potential difference between the common electrode 210 and the pixel electrodes 110 of the second EW member 24. Hence, each subpixel of the first EW member 22 and each subpixel of the second EW member 24 may be independently and individually controlled.

In one embodiment, the colored liquid 320 of the first EW member 22 is colored with red, green, or blue, and the colored liquid 320 of the second EW member 24 are colored with cyan, magenta, or yellow. Each color in the first EW member 22 is aligned with its complement in the second EW member 24: red with cyan, green with magenta, and blue with yellow. Hence, when the colored liquids 320 in both layers of a subpixel are in "off" states, light that passes through one layer of the colored liquid 320 will be absorbed by the overlapping colored liquid 320, displaying black for the subpixel. When a potential difference is applied to a subpixel such that the colored liquids 320 in both layers are turned "on," a substantial portion of the light does not travel through colored liquid 320, thereby displaying white for the subpixel.

Pure red, green, or blue may be presented by turning "on" their complements on the second panel 24. Yellow may be formed by turning "on" its blue complement on the first panel 22. Brightness may be enhanced by activating the cyan and magenta on the second panel 24, adding the red and green subpixels. Cyan may be formed in a similar manner, by turning "on" its red complement in the first panel 22. Magenta may be formed by turning "on" its green complement, optionally brightened by also turning "on" the yellow and cyan. Desaturation of color may be achieved by turning "on" other subpixels. Many ways of achieving a desired color and brightness exist.

Figure 3:
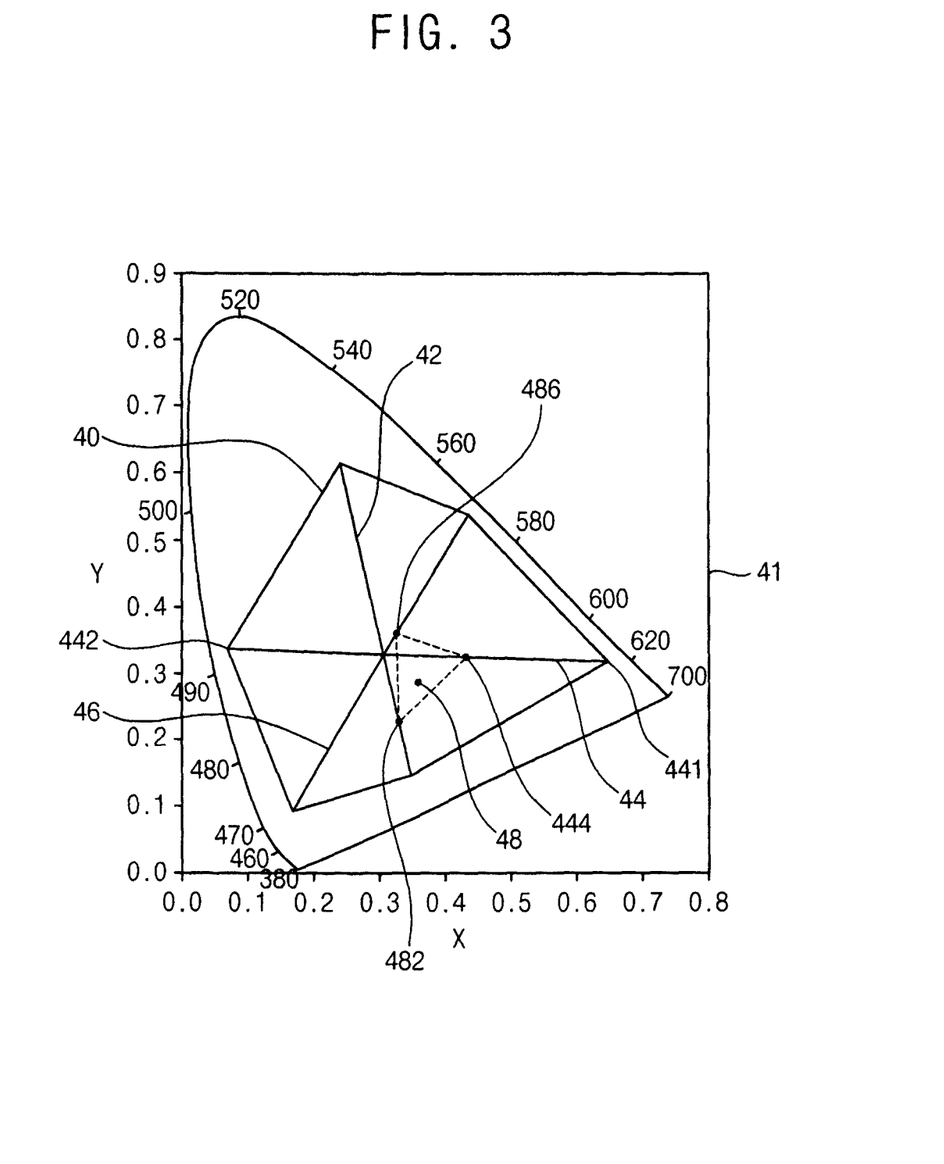
FIG. 3 shows the color gamut of one of the embodiments of FIG. 2.

Display systems using more than three primary subpixel colors to form color images, such as the embodiment of FIG. 2, are referred to as "multi-primary" display systems. FIG. 3 shows a color gamut map 40 for the multi-primary display panel of FIG. 2. As shown, each subpixel of the dual-layered EW panel 20 can be controlled to generate colors along one of the three axes 42, 44, 46. The hexagonal structure formed by connecting the ends of the three axes 42, 44, 46 define the possible color gamut for the display device of this example. Although each subpixel is a subtractive color system, the total color seen by a viewer may be described as an additive color system in that each subpixel adds a color primary when displaying a given subtractive color. In other words, each color pair is a variable additive primary, e.g. one primary is a variable color primary defined as any color between the color complements in the dual-layered EW panel 20. The primary includes white, where the three variable primary colors intersect. A wide color gamut can be provided when used with a gamut mapping algorithm that accounts for the gradual shift in color primary from red-to-cyan, green-to-magenta, or blue-to-yellow as the colored liquids 320 are switched to intermediate states, and a subpixel rendering algorithm that maintains a high resolution.

The degree to which a subpixel's complement is turned "on" ("energized") determines the brightness, by reduction of the subtractive color. The ratio of potential differences applied to one layer of colored liquid 320 and its complement determines the color along the linear range of the relevant axes 42/44/46. Thus, in the hypothetical case of perfect filters, the pixel color for red-cyan is as follows:

$$R=Vc$$

$$G=Vr$$

$$B=Vr \text{ wherein Vx is a value for a color x.}$$

Looking at a flat patch of color, the RGB components may be determined as follows:

$$R=Vc+Vg+Vb$$

$$G=Vr+Vm+Vb$$

$$B=Vr+Vg+Vy.$$

Thus, knowing the six values for the subpixels, the RGB color value may be calculated. However, as there are three equations with six controllable variables, further constraints may be added to enable the conversion from RGB or other suitable color input (e.g. XYZ, YCrCb, etc.) to be determinant, so as to choose from the large number of possible metamers of the desired color. One such constraint is that each subpixel should reproduce the luminance of the input RGB value assigned to that subpixel.

$$L_{r/c}=RLr+GLg+BLb=VcLr+VrLg+VrLb.$$

Extending the formula to produce a full set with the luminance constraint, we get the following:

$$L_{g/m}=VmLg+Vg(Lr+Lb)$$

$$L_{b/y}=VyLb+Vb(Lr+Lg),$$

wherein Lx is the luminance contribution coefficient.

Figure 4:
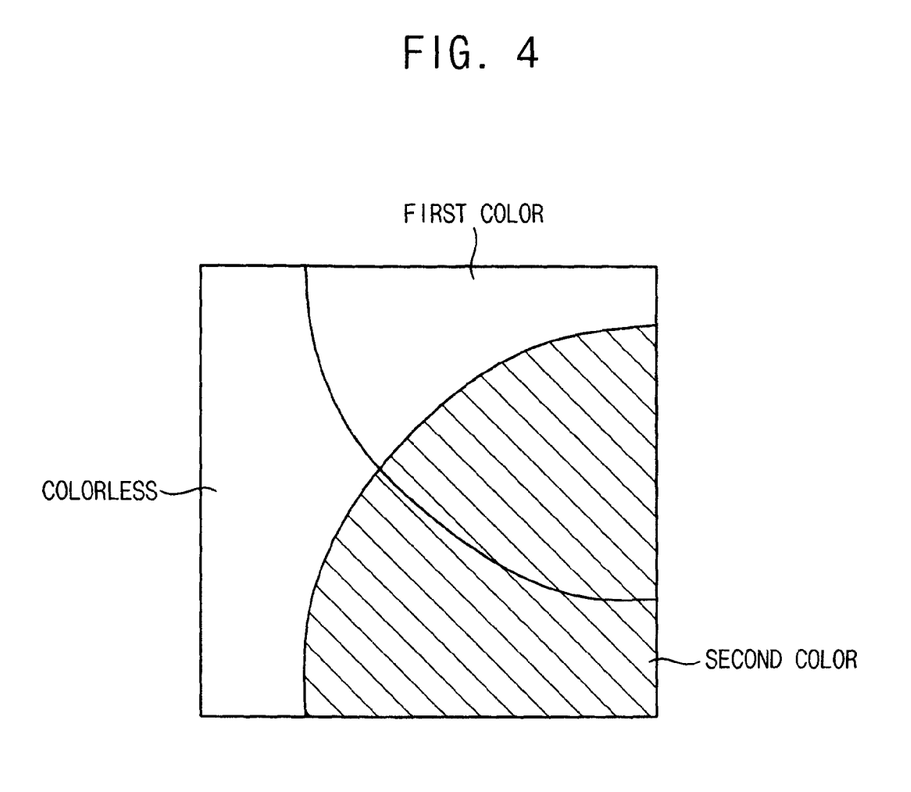
FIG. 4 is a top view of a subpixel in an electro-wetting panel of FIG. 2.

As an additional constraint, each subpixel may use the color closest to what is desired per the input RGB data. For example, a gray field may include different colors that together produce the desired shade of gray to the human vision system, but it is also possible to have each subpixel at exactly the desired shade of gray. Yet another constraint may be to select a set of primaries, A:B:C, that are approximately equidistant, as shown in FIG. 3. This allows color mixing of equally valued primaries. Shown in FIG. 4 is the CIE 1931 chromaticity diagram 41 illustrating an exemplary color gamut 40 of dual layer EW panel using complementary colors. There are three variable primaries: red-cyan 44, green-magenta 42, and blue-yellow 46. A single variable primary subpixel may take on any color and brightness along the internal line, for example: the variable primary red-cyan, may take on any color from red 441 to cyan 442 along the color line 44 between them. If one wishes to display a color that is not on one of these lines, he may additively mix colors from two or three variable primaries. For example, if one were to display a pinkish-purple color 48, he may set the green-magenta variable primary 42 to a pastel magenta 482, the blue-yellow variable primary 46 to a pale yellowish off white 486, and the red-cyan variable primary 44 to a pale orange-ish red 444, in the right brightness proportions. Many possible metameric combinations of colors and relative brightnesses of the variable primaries may be used to achieve a given color and brightness, allowing the display to reproduce color at a resolution slightly lower than the subpixel resolution, while reconstructing the image luminance at the subpixel resolution for many images.

With the dual-layer EW panel 20 of FIG. 2, some saturated colors may be formed from all of the subpixels and will be brighter than in a conventional primary RGB system where each subpixel is fixed at a preselected color. For example, to produce a bright yellow image with a conventional RGB system, the red and green subpixels contribute light. In the dual-layer EW panel 20, the variable red-to-cyan primary is set to be red and is fully on, the variable green-to-magenta primary is set to be green and fully on, and the blue-to-yellow primary is set to yellow and fully on. This allows high brightness and full subpixel rendered resolution for these colors. Simultaneous contrast error is reduced vis-à-vis a conventional display device, especially for yellow.

When the subpixels in both layers are controlled simultaneously, the display can provide a high-contrast black and white image, black being where both layers of the complementary colored colored liquids cover the base and white being where neither layer of the colored liquids cover all the base. Given that each subpixel may be operated as black-and-white, it may be advantageous to use square subpixels as in conventional black-and-white display panels.

Depending on the application, the colorless liquid 310 may be replaced with a liquid that has a color, as long as it, together with the colored liquids 320, is capable of displaying the range of desired colors. Although the colorless liquid 310 is described as being "colorless" in the specific embodiments provided herein, the invention is not limited to the liquid between the two EW members 22, 24 being colorless.

Figure 6:
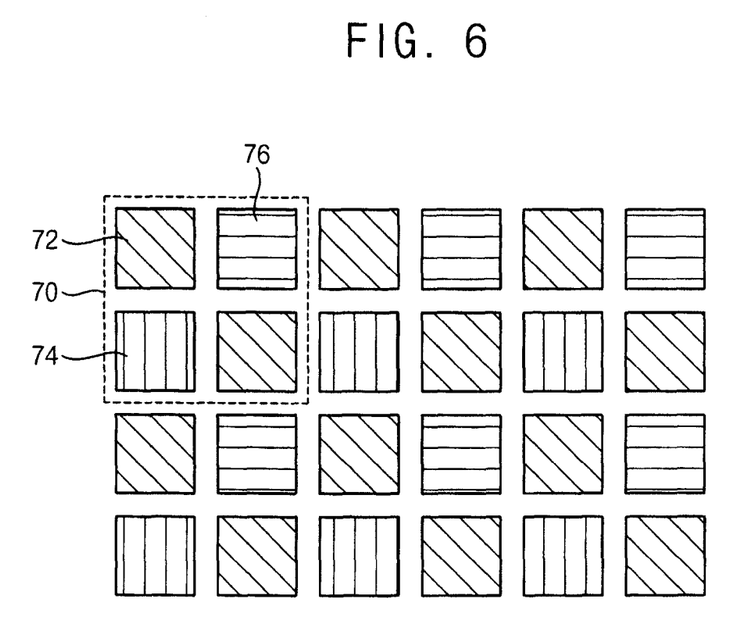
FIG. 6 shows a Bayer pattern-like arrangement of the variable primary subpixels.
Figure 7:
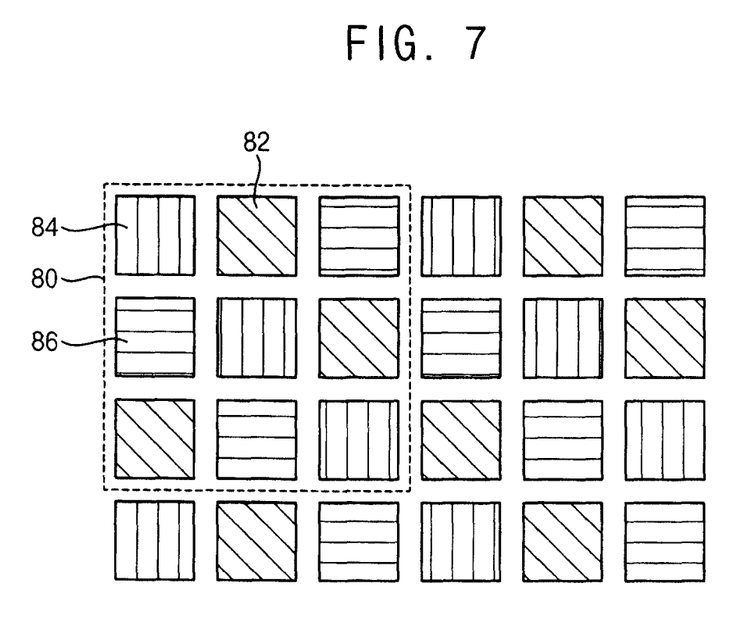
FIG. 7 shows a Diagonal Mosic pattern-like arrangement of the variable primary subpixels.
Figure 8:
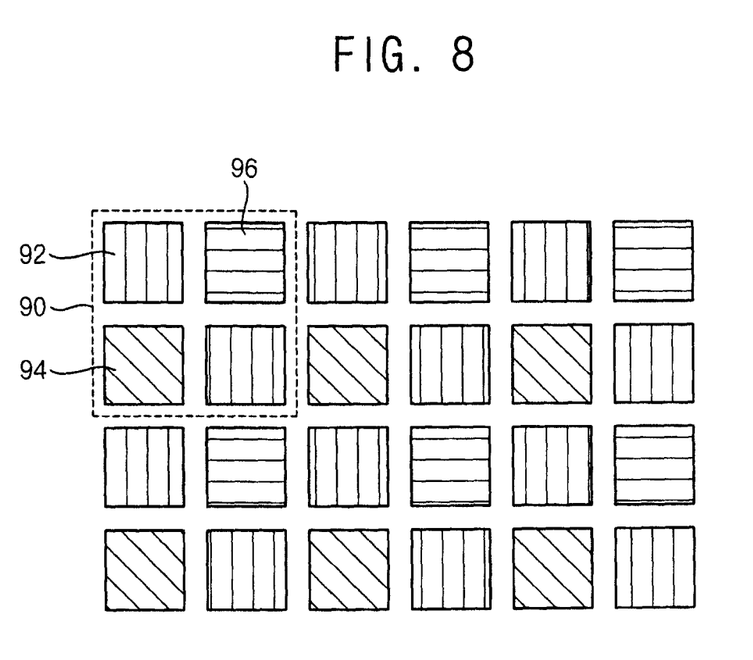
FIG. 8 shows a Modified Bayer pattern-like arrangement of the variable primary subpixels.

When used to display color images, the subpixels may be laid out in either the Bayer pattern or the Diagonal Mosaic-like patterns, both of which are known. The Bayer pattern is shown in FIG. 6, and comprises a repeat cell 70 of four subpixels: two green-magenta subpixels 72, one blue-yellow 76, and one red-cyan 74. With the Bayer pattern, the green liquid may be more saturated and darker to provide more color gamut toward green. A modified Bayer-like pattern, shown in FIG. 8, in which each repeat cell 90 has two red-cyan subpixels, one green-magenta subpixel 92, and one blue-yellow subpixel 96 may be used. This modified Bayer-like pattern has the advantage that red may be sampled more often, and is made to be brighter, due to more subpixels and being more highly saturated and deeper into the red, extending the color gamut where it is most useful. The Diagonal Mosaic pattern is shown in FIG. 7. It includes a repeat cell 80 of nine subpixels: three green-magenta subpixels 82, three red-cyan subpixels 84, and three blue-yellow subpixels 86. With the Diagonal Mosaic pattern, a good RGB color balance is achieved.

In one mode of operation, only one panel of the dual-layer electro-wetting panel 20 may be actively controlled. In the layer that is not actively controlled, the colored liquid 320 remains in the "off" state, covering the hydrophobic layer. This embodiment may provide reduced brightness compared to the embodiment where both panels are actively controlled because the light will always travel through at least one layer of colored liquid 320.

In an alternative embodiment, the first EW member 22 has red, green, and blue colored liquid 320 and the second EW member 24 has dark/black colored liquid 320 (instead of cyan, magenta, and yellow as in the above embodiment). In this embodiment, the color of each subpixel varies from white to saturated primary color of each colored liquid 320.

FIG. 4 depicts a subpixel as viewed from the top ("top" relative to FIG. 2) and illustrates an example of how the complementary colored liquids 320 may be made to overlap. In the particular example, each colored liquid 320 is at half-coverage—that is to say, that the subpixel's two stacked EW light valves are each turned on 50%—and rotated by 90-degrees with respect to each other. This configuration may provide good color saturation stability.

Figure 5:
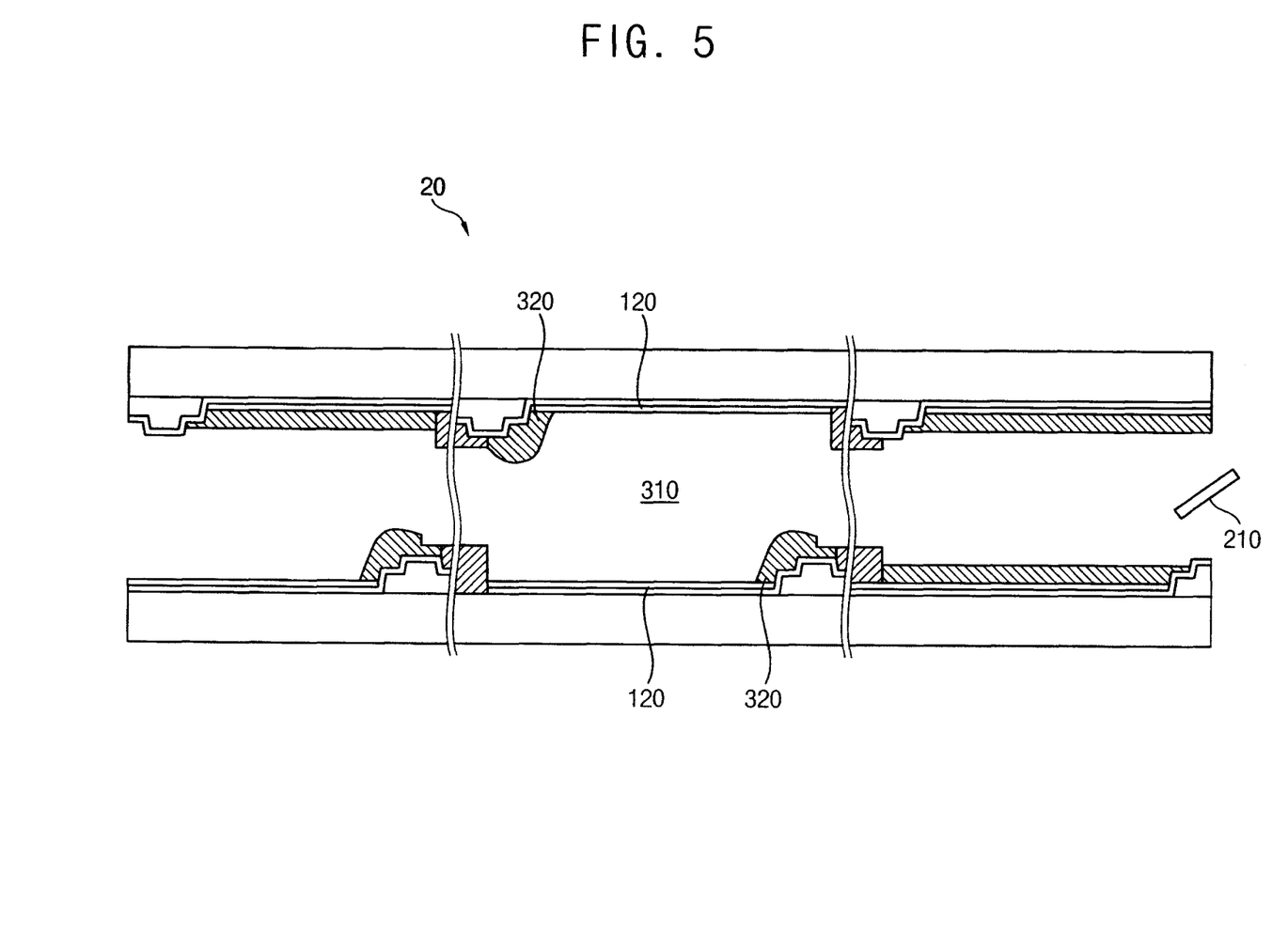
FIG. 5 is a cross-sectional diagram of a dual-layer electro-wetting panel in accordance with another embodiment of the invention.

FIG. 5 is a cross-sectional diagram of a dual-layer electro-wetting panel 20 in accordance with another embodiment of the invention. This embodiment is substantially similar to the embodiment of FIG. 2, except for the relative positions of the colored liquid 320 in the complements in the turned "on" state. In the embodiment of FIG. 2, the colored liquid 320 in the complements were substantially aligned when both were turned "on". In this embodiment, the hydrophobicity of the hydrophobic layer of the two complements are manipulated such that the colored liquid 320 of the complements contract to non-overlapping positions within the subpixel. Although the positions of the TFTs in FIG. 5 are also changed relative to the embodiment of FIG. 2, this is done just to illustrate that the invention is not specific to any particular positioning of the TFTs.

Figure 9:
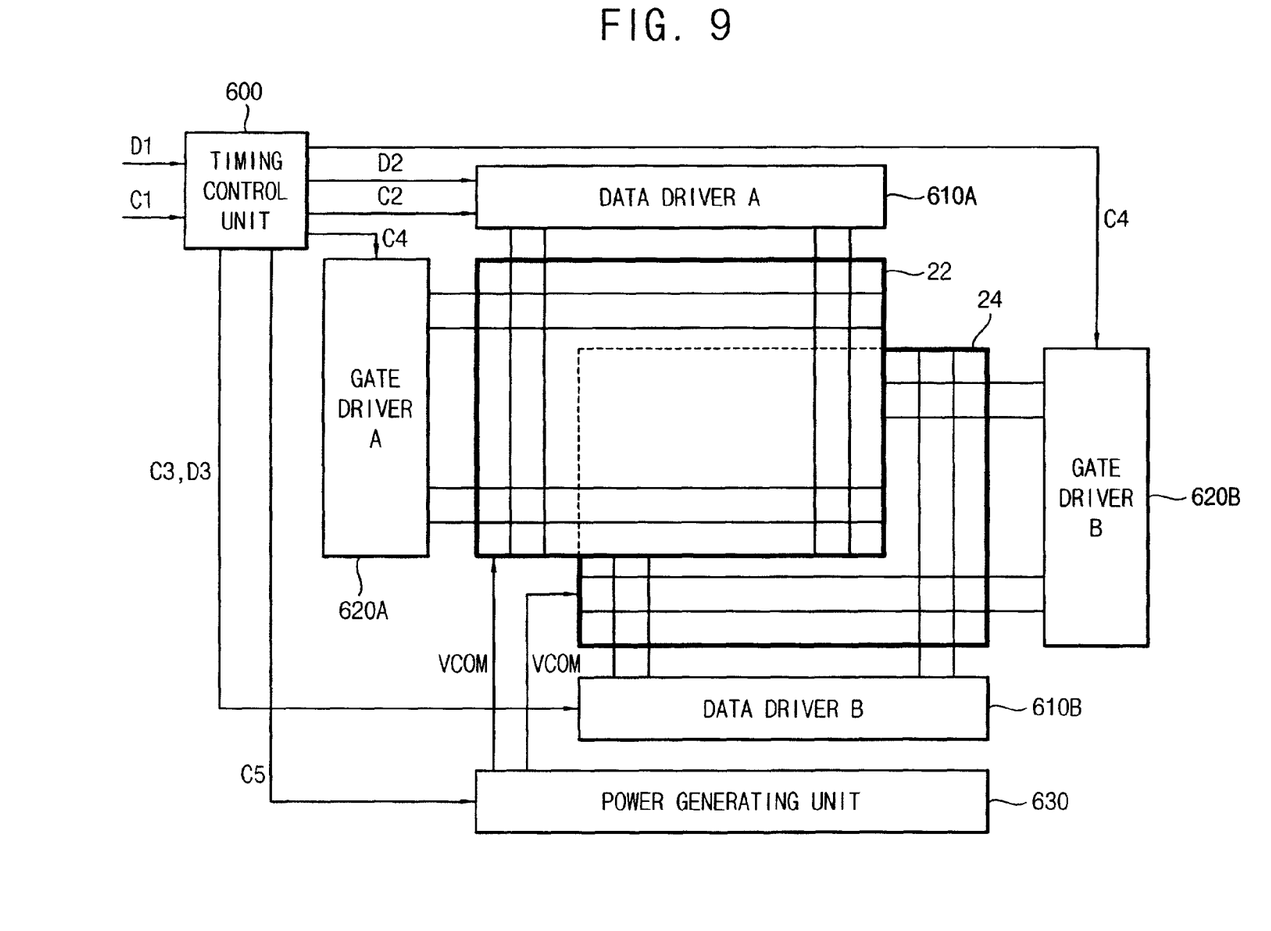
FIG. 9 shows a block diagram illustrating a display device including the dual-layered EW panel in accordance with one embodiment of the invention.

FIG. 9 shows a block diagram illustrating a display device including the dual-layered EW panel 20 in accordance with one embodiment of the invention. As shown, the display device includes a timing control unit 600, data driving units 610A and 610B, gate driving units 620A and 620B, a power generating unit 630, first EW member 22, and the second EW member 24. The data driver 610A and the gate driver 620A drive the first EW member 22. The data driver 610B and the gate driver 620B drive the second EW member 24. The timing control unit 600 receives first gray scale data signal D1 and a first control signal C1 from an external source, e.g. a graphic controller. The first control signal C1 may include a vertical synchronous signal, a horizontal synchronous signal, a data enable signal, and a main clock signal. The timing control unit 600 outputs a second gray scale data signal D2 and third gray scale data signal D3 to the data driving units 610A, 610B, respectively, for the first and second EW members 22, 24, as determined by one of the known gamut mapping techniques. Similarly, the timing control unit 600 outputs a second control signal C2 and a third control signal C3 to the data driving units 610A, 610B, respectively. The second and third control signals C2, C3 may include a load signal and a start horizontal signal. In addition, the timing control unit 600 provides fourth control signals C4 to the gate driving units 620A, 620B. Although not specifically illustrated in the figure, the power generating unit 630 supplies power to the timing control unit 600, the data driving units 610A, 610B, and the gate driving units 620A, 620B and provides the common voltage Vcom to the common electrode 210. The data driving units and gate driving units operate in the manner generally known in the field of display devices. A person of ordinary skill in the art would know to include a suitable sub-pixel rendering module to generate the desired image with the desired colors.

The dual-layer EW panel 20 may be manufactured using generally known techniques. The substrate 100 may be glass, and the electrode layers may be made of one or more of tantalum, titanium, molybdenum, aluminum, chromium, copper, and tungsten, among other well-known options. The hydrophobic layer 120 is formed by injecting a hydrophobic liquid from a tank into a subpixel area defined by the partitions 300, for example by an inkjet injection process. Alternatively, a spin-coating process may be used. The inkjet injection process may also be used to add a preselected volume of the colored liquid 320 from a second tank, to fill the space adjacent to the hydrophobic layer 120.

After first and second EW members 22, 24 are prepared, they are positioned in an overlapping manner with substrates 100 on the outside and coupled, e.g. with a sealant. Using an inkjet process, colorless liquid 310 is injected onto each of the two panels 22, 24 through an injection hole until the space is filled. The common electrode 210 is then placed in contact with the colorless liquid 310.

It should be understood that the invention can be practiced with modification and alteration within the spirit and scope of the appended claims. The description is not intended to be exhaustive or to limit the invention to the precise form disclosed. It should be understood that the embodiments described herein may be practiced with modifications and alterations.

What is claimed is:

1. A display panel comprising:
    a first electro-wetting panel having a subpixel with a first colored liquid having a first color; and
    a second electro-wetting panel disposed on the first electro-wetting panel and having a subpixel with a second colored liquid of a second color, wherein the second colored liquid overlaps the first colored liquid;
    wherein shapes of the first colored liquid and the second colored liquid are independently controllable via individual switching devices; and
    wherein the subpixel of the first electro-wetting panel is rotated by 90° with respect to the subpixel of the second electro-wetting panel.

2. The display panel of claim 1, wherein the first color and the second color are complementary.

3. The display panel of claim 1, wherein the first color is one of red, green, and blue and the second color is one of cyan, magenta, and yellow.

4. The display panel of claim 1, wherein the first color is one of red, green, and blue and the second color is black.

5. The display panel of claim 1, further comprising a colorless liquid contacting the first colored liquid and the second colored liquid.

6. The display panel of claim 5, wherein the colorless liquid does not mix with either the first colored liquid or the second colored liquid.

7. The display panel of claim 6, wherein the first and second colored liquids are nonpolar liquids, and the colorless liquid is a polar liquid.

8. The display panel of claim 5, wherein a shape of the liquid of the first color is controlled by a potential difference between a first pixel electrode and the colorless liquid, and a shape of the liquid of the second color is controlled by a potential difference between a second pixel electrode and the colorless liquid.

9. A method of manufacturing a display panel, comprising:
    providing a first member having a first substrate, that has a plurality of first subpixels, wherein each of the first subpixels has its own first pixel electrode connected to a first switching device for the first pixel electrode, a first hydrophobic layer, and a first colored liquid having a first color;
    providing a second member having a second substrate that has a plurality of second subpixels, wherein each of the second subpixels has its own second pixel electrode connected to a second switching device for the second pixel electrode, a second hydrophobic layer, and a second colored liquid of a second color;

positioning a common electrode to form potential differences with the first pixel electrode and the second pixel electrode such that the shapes of the first and second colored liquids in each of the first and second subpixels change according to the respective potential differences;

combining the first and second member such that the first and second colored liquids overlap spaced apart from each other by a gap; and filling the gap with a colorless liquid.

10. The method of claim 9, further comprising aligning one of first subpixels containing the nonpolar liquid of the first color with one of the second subpixels containing the nonpolar liquid of the second color.

11. The display panel of claim 9, further comprising a colorless liquid in contact with the first and second colored liquids, the colorless liquid receiving a common voltage.

12. The display panel of claim 11, wherein the first and second colored liquids are nonpolar liquids and the colorless liquid is a polar liquid.

13. A display panel comprising:

a first member having multiple subpixels, each having a first substrate, a first hydrophobic layer, a first colored liquid of a first color, and a first pixel electrode connected to a first switching device for the first pixel electrode;

a second member having multiple subpixels, each having a second substrate, a second hydrophobic layer, a second colored liquid having a second color, and a second pixel electrode connected to a second switching device for the second pixel electrode, wherein the first member and the second member are coupled to each other such that the first and second colored liquids overlap; and a common electrode positioned to form potential differences with the first pixel electrode and the second pixel electrode such that the shapes of the first and second colored liquids in each of the first and second subpixels change according the respective potential differences.

14. The display panel of claim 13, wherein the first color and the second color are complementary.

15. The display panel of claim 13, wherein the subpixels of the first member contain first colored liquids that are red, green, and blue, and the subpixels of the second member contain second colored liquids that are cyan, magenta, and yellow.

16. The display panel of claim 13, wherein the first color is one of red, green, and blue and the second color is black.

* * * * *